(12) United States Patent
Rossmann et al.

(10) Patent No.: US 11,884,251 B2
(45) Date of Patent: Jan. 30, 2024

(54) VEHICLE CONTROL SYSTEM AND METHOD

(71) Applicant: Westinghouse Air Brake Technologies Corporation, Wilmerding, PA (US)

(72) Inventors: Alexandre Rossmann, Juiz de Fora (BR); Amit Saxena, Marion, IA (US); Keith Smith, Cedar Rapids, IA (US)

(73) Assignee: westinghouse Air Brake Technologies Corporation, Wilmerding, PA (US)

( * ) Notice: Subject to any disclaimer, the term of this patent is extended or adjusted under 35 U.S.C. 154(b) by 605 days.

(21) Appl. No.: 16/720,366

(22) Filed: Dec. 19, 2019

(65) Prior Publication Data
US 2021/0188223 A1    Jun. 24, 2021

(51) Int. Cl.
*B60T 7/12* (2006.01)
*B61H 13/02* (2006.01)
*B60T 8/17* (2006.01)

(52) U.S. Cl.
CPC .............. *B60T 7/12* (2013.01); *B60T 8/1705* (2013.01); *B61H 13/02* (2013.01)

(58) Field of Classification Search
CPC ........ B60T 17/228; B60T 17/221; B60T 7/12; B60T 13/665; B60T 13/662; B60T 7/085; B60T 17/22; B60T 2270/402; B60T 8/1705; B60T 8/885; B60T 13/686; B60T 13/746; B60T 7/042; B60T 7/107; B60T 7/14; B60T 11/103; B60T 17/18; B60T 2201/03; B60T 7/16; B60T 1/10; B60T 2270/413; B60T 7/045; B60T 7/122; B60T 8/171; B60T 13/261; B60T 2201/10; B60T 13/741; B60T 2201/04; B60T 2270/604; B60T 7/22; B60T 8/3255; B60T 8/88; B60T 13/18; B60T 13/385; B60T 13/588; B60T 13/743; B60T 13/745; B60T 15/041; B60T 2201/06; B60T 2230/04; B60T 2270/89; B60T 7/18; B60T 8/1703; B60T 8/245; B60T 8/32; B60T 8/58; B60T 13/24; B60T 13/66; B60T 13/683; B60T 13/74; B60T 15/027; B60T 15/048; B60T 15/54; B60T 17/081; B60T 17/085; B60T 17/12; B60T 2201/022; B60T 2210/30; B60T 2210/36; B60T 2220/04; B60T 2250/00; B60T 2260/08; B60T 2260/09; B60T 2270/40; B60T 2270/403;
(Continued)

(56) References Cited

U.S. PATENT DOCUMENTS 5,340,202 A    8/1994  Day
5,394,137 A    2/1995  Orschek
(Continued)

FOREIGN PATENT DOCUMENTS

JP    2008132887 A  *  6/2008

*Primary Examiner* — Angela Y Ortiz
*Assistant Examiner* — Aarron E Santos
(74) *Attorney, Agent, or Firm* — Jason P. Gross; The Small Patent Law Group LLC

(57) ABSTRACT

Method and system may be configured to determine a stationary time period during which a vehicle has remained stationary. The method and system may be further configured to enable a parked function of the vehicle in response to determining that the stationary time period exceeds a designated threshold. While the parked function is enabled, the vehicle applies a braking effort to the vehicle in response to detecting movement of the vehicle.

17 Claims, 5 Drawing Sheets

(58) Field of Classification Search
CPC .......... B60T 7/128; B60T 8/172; B60T 8/175; B60T 8/176; B60T 8/18; B60T 8/1893; B60T 8/26; B60T 8/267; B60T 8/3235; B61H 13/02; B61H 13/00; B61H 13/04; B61H 13/20; B61H 13/34; B61H 9/006; B61H 11/06; B61H 11/10; B61H 13/30; B60W 11/10; B60W 13/30; B60W 30/18109; B60W 10/184; B60W 30/143; B60W 10/06; B60W 10/08; B60W 10/10; B60W 10/11; B60W 2520/10; B60W 2556/50; B60W 2710/182; B60W 30/18072; B60W 50/14; B60W 10/188; B60W 2050/143; B60W 2050/146; B60W 2510/1005; B60W 2510/182; B60W 2510/186; B60W 2510/188; B60W 2540/10; B60W 2540/12; B60W 2552/20; B60W 2710/1005; B60W 2720/103; B60W 30/18018; B60W 30/18054; B60W 30/18118; B60W 30/18127; B60W 30/18136; B60W 50/0097; B60W 50/0205; B60W 50/16; B60W 10/18; B60W 2030/1809; B60W 2050/022; B60W 2552/00; B60W 2554/00; B60W 2556/55; B60W 2556/65; B60W 50/029; B60W 10/04; B60W 10/182; B60W 10/20; B60W 2710/105; B60W 2710/18; B60W 2720/10; B60W 30/188; B60W 50/04; B60W 50/12; B61C 17/12; B61C 15/12; B61C 5/00; B61C 15/08; B61L 15/0081; B61L 15/0027; B61L 25/025; B61L 15/0018; B61L 2205/04; B61L 27/0077; B61L 27/0094; B61L 15/0036; B61L 2201/00; B61L 23/02; B61L 23/14; B61L 25/028; B61L 17/00; B61L 23/34; B61L 25/02; B61L 25/021; B61L 25/023; B61L 25/04; B61L 27/0005; B61L 27/0011; B61L 27/0083; B60D 1/02; B60D 1/00; B60D 1/01; B60D 1/04; B60D 1/07; B60D 1/075; B60D 1/143; B60D 1/167; B60D 1/1675; B60D 1/36; B60D 1/363; B60D 1/40; B60D 2001/005; F16D 2121/24; F16D 55/226; F16D 65/18; F16D 66/021; F16D 2066/003; F16D 65/28; F16D 66/025

See application file for complete search history.

(56) References Cited

U.S. PATENT DOCUMENTS

| | | | |
|---|---|---|---|
| 6,943,675 | B2 | 9/2005 | Peterson |
| 8,924,117 | B2 | 12/2014 | Kull |
| 9,026,281 | B2 | 5/2015 | Murphy |
| 9,150,208 | B2 | 10/2015 | Schemmel |
| 9,174,655 | B2 * | 11/2015 | Meltser ................... B61C 17/12 |
| 10,293,800 | B2 | 5/2019 | Yokoyama |
| 10,392,031 | B2 * | 8/2019 | Worden ............... B60T 8/1705 |
| 2013/0103267 | A1 | 4/2013 | DeWitt |
| 2016/0130788 | A1 * | 5/2016 | Nee ........................ B60T 13/662 701/50 |
| 2017/0066458 | A1 * | 3/2017 | Huchrowski ....... B61L 15/0081 |
| 2018/0327006 | A1 * | 11/2018 | Nitti .................... B61L 15/0036 |

* cited by examiner

VEHICLE CONTROL SYSTEM AND METHOD

BACKGROUND

Technical Field

The subject matter herein relates generally to vehicle control systems.

Discussion of Art

Vehicle systems use braking systems to slow and stop the vehicle systems. Various types of vehicle systems include one or more braking systems. For example, automobiles, trucks, marine vessels, off-highway vehicle systems, agricultural vehicle systems, locomotives or other railway vehicle systems, and the like use multiple braking systems for the different situations that the vehicle system may encounter. Braking systems may use friction between two surfaces to slow or stop a vehicle system or may use other phenomena. For instance, dynamic braking systems and regenerative braking systems use electrodynamics to decrease the speed of a vehicle system.

For many vehicle systems, a separate braking mechanism is used when the vehicle system is stopped and the operator of the vehicle system is not present. This braking mechanism may be referred to as a parking brake. In many situations, the vehicle system is parked at an incline such that the vehicle system must remain stationary while resisting the gravitational pull on the vehicle system. The parking brake is configured to resist such forces and prevent the vehicle system from moving from the parked location.

Conventional parking brakes include hand brakes that are manually applied by an operator of the vehicle system. More recently, parking brakes have been developed that do not require manual application by the operator. Such brakes can be spring-loaded, pneumatically driven, or driven by an electrical motor. Vehicle system operators, however, can forget to manually apply hand brakes or forget to enable the braking system that applies a braking effort if the vehicle system, while parked, begins to move. In some instances, an operator can misjudge a situation and believe that it is not necessary to enable the braking system.

BRIEF DESCRIPTION

In accordance with one embodiment, a system is provided that includes a controller configured to determine a stationary time period during which a vehicle has remained stationary. The controller is further configured to enable a parked function of the vehicle in response to determining that the stationary time period exceeds a designated threshold. While the parked function is enabled, the vehicle applies a braking effort to the vehicle in response to detecting movement of the vehicle.

In accordance with one embodiment, a method is provided that includes determining a stationary time period during which a vehicle has remained stationary. The method also includes enabling a parked function of the vehicle in response to determining that the stationary time period exceeds a designated threshold and applying, while the parked function is enabled, a braking effort to the vehicle in response to detecting movement of the vehicle.

In accordance with one embodiment, a system is provided that includes a controller of a propulsion-generating vehicle that is part of a vehicle system including other propulsion-generating vehicles. The controller is configured to determine whether the propulsion-generating vehicle is a lead vehicle or a remote vehicle of the vehicle system whose movements are dictated by the lead vehicle. When the propulsion-generating vehicle is a lead vehicle, the controller is also configured to detect that the lead vehicle is stopped and that a main engine of the vehicle system is shut down and determine a stationary time period during which the lead vehicle has remained stationary. The controller is also configured to detect a device setting of an operator-controlled device. The operator-controlled device controls a physical mechanism that affects movement of the lead vehicle. The controller is also configured to enable a parked function of the lead vehicle in response to determining that the stationary time period exceeds a designated threshold and that the device setting is a select device setting from one of multiple potential device settings of the operator-controlled device.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
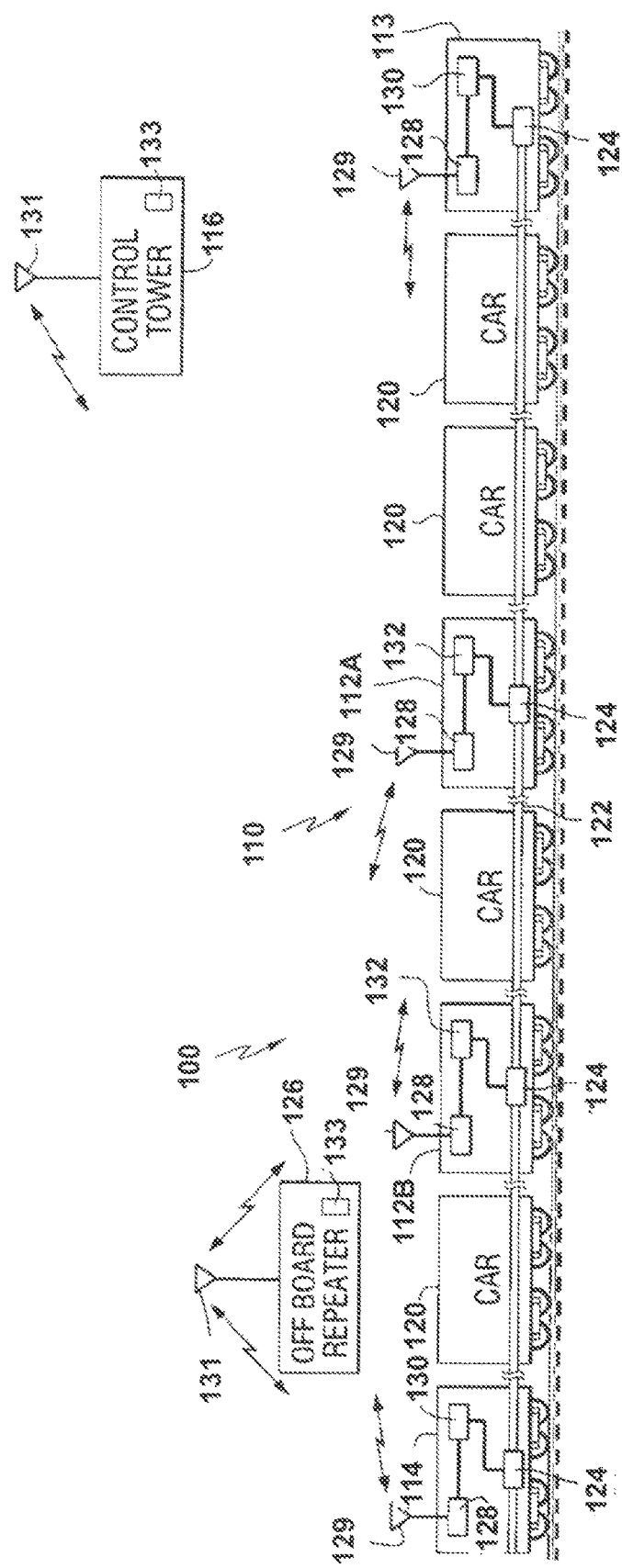
FIG. 1 illustrates a vehicle system in accordance with an embodiment.

Embodiments of the subject matter described herein include systems (e.g., vehicle control systems) and methods for automatically enabling a parked function (or mode) of a vehicle system in response to one or more conditions being satisfied. While the parked function is enabled, the vehicle system applies a braking effort to the vehicle system in response to detecting movement of the vehicle system. Embodiments may also include an article of manufacture, such as a computer-readable medium (e.g., a tangible and non-transitory computer readable storage medium) having a program (e.g., one or more sets of instructions for directing a processor to perform one or more operations) recorded thereon. The program may enable a vehicle system or sub-system to automatically enable the parked function. For example, the program may enable an on-board or off-board system to receive data from one or more sensors of the vehicle system and issue commands to at least one braking system of the vehicle system. In particular embodiments, the vehicle system forms a train having multiple locomotives and one or more rail cars.

In certain embodiments, if the vehicle system senses movement of the vehicle system while in the parked function, the vehicle system performs a penalty brake application to stop the movement. Operation of the parked function may be influenced by or a function of a status of the braking system (e.g., brake pressure) and/or the DP arrangement of the vehicle systems.

Optionally, the parked function may be manually enabled by the operator. For example, the operator may initiate the parked function by pressing a physical button or by selecting an option on a computer display. The parked function may be automatically enabled by a control system of the vehicle system if one or more conditions are satisfied.

One condition for automatically enabling the parked function may be a designated device setting of an operator-controlled device or a combination of device settings of multiple operator-controlled devices. In addition to providing one condition for enabling the parked function, the operator-controlled device may be or may control a physical mechanism of the vehicle system that controls at least one operation of the vehicle system. For example, in certain embodiments, the operator-controlled device includes a reverser of the vehicle system. The reverser is configured to change a direction of movement of the vehicle system. In locomotives, the reverser can have one of a predetermined number of settings. For example, for some locomotives, the reverser can have a forward setting which enables the locomotive to move in a first direction, a rearward (or reverse) setting that enables the locomotive to move in a second direction that is opposite the first direction, or a neutral setting that enables the locomotive to move in either direction. Although the described example only has three settings, it is contemplated that the operator-controlled device may have one setting, two settings, or more than three settings.

In some embodiments, the reverser is movable object that is configured to be engaged by an operator and moved to a different position, thereby changing the setting of the reverser. The movable object may be, for example, a lever that is configured to be moved to three different positions. Optionally, the reverser may be physically removable such that the operator removes the reverser prior to exiting the locomotive. With the reverser removed, another individual may not be permitted to move the locomotive. In some cases, the vehicle system is capable of idling while the reverser is removed.

In some embodiments, the reverser includes or is operably connected to a circuit device that is used to change motor connections in order to change the direction of motor rotation and, consequently, the direction of movement. In such instances, the settings of the reverser can be selected by, for example, moving a switch, rotating a knob, or pressing a button. As another example, a user-selectable element can be displayed on a computer screen and may be selected by the operator to change the setting of the reverser.

Alternatively or in addition to the reverser, the operator-controlled device can be other devices that are capable of having different device settings. For example, the operator-controlled device may be a steering wheel having multiple rotational settings or a gearbox having a predetermined number of selectable gear settings. Similar to the reverser, each of the steering wheel and the gearbox at least one of controls, determines, or affects another operation of the vehicle system. Specifically, the steering wheel is operably coupled to a physical mechanism that determines a direction of movement of the vehicle system, and the gearbox is a physical mechanism that determines which gears are engaged.

Yet in other embodiments, the operator-controlled device does not control another operation of the vehicle system. As such, the operator-controlled device may be used exclusively for automatically enabling the parked function. For example, a dashboard button, when enabled, may satisfy one condition for automatically enabling the parked function. The operator-controlled device may also be a knob or lever or another movable object.

Vehicle systems may include a single vehicle or a group of vehicles in which some or all of the vehicles can contribute at least one of propulsive efforts or braking efforts. For example, at least some embodiments may have a distributed power (DP) configuration or arrangement of propulsion-generating vehicles (e.g., locomotives). One of the conditions for automatically enabling the parked function may be whether a designated vehicle is a master vehicle system (called lead vehicle) of the vehicle system or a slave vehicle system (called remote vehicle) of the vehicle system. Lead vehicles transmit commands to one or more remote vehicles so that the lead and remote vehicles may coordinate efforts in moving the vehicle system.

Another condition for automatically enabling the parked function may include a time period in which the vehicle system has not moved. For instance, the parked function may be enabled only after the vehicle system remains stationary (e.g., motionless) for a threshold time period. The time period may be predetermined or preset (e.g., thirty seconds), or the time period may be a function of multiple factors, such as the time of day, geographic location of the vehicle system, or status of the braking system.

The following illustrates particular examples of possible combinations of conditions that might be used for automatically enabling the parked function. As a first example, the parked function can be enabled in response to the stationary time period having exceeded a designated threshold and the operator-controlled device having a select device setting among multiple potential settings that affect operation of the vehicle system. More specifically, the parked function may be enabled if the reverser is in a neutral position and the vehicle system has been stopped for at least thirty (30) seconds.

In a second example, the parked function can be enabled in response to the stationary time period having exceeded a designated threshold, the operator-controlled device having a select device setting among multiple potential settings that affect operation of the vehicle system, and the vehicle system being a lead vehicle of the vehicle system. More specifically, the parked function may be enabled if the reverser is in a neutral position, the vehicle system has been stopped for at least twenty (20) seconds, and the vehicle system is a lead vehicle of the vehicle system. The lead status of the vehicle system may be determined by one or more methods as described herein. For example, the lead status of the vehicle system may be determined by an air brake system of the vehicle system.

After the parked function of the vehicle system is enabled, the parked function may be disabled if one or more conditions are satisfied. These conditions may include a change in the device setting of the operator-controlled device. For example, the parked function may be disabled if the reverser is moved from the neutral position to a forward position or to a rearward position. As another example, the parked function may be disabled if the lead status of the vehicle system changes from a lead vehicle to a remote vehicle. The one or more conditions may also include a different device controlled by the operator other than devices that are used for enabling the parked function. For example, a button may be pressed by the operator or a key may be turned to disable the parked function.

Throughout this document the term vehicle system is used. A vehicle system may include only one vehicle system or more than one vehicle system. If the vehicle system includes more than one vehicle system, the vehicle systems may be operably coupled to each other such that the vehicle systems move together as a system along a route. Optionally, the vehicle systems may coordinate their tractive efforts and braking efforts to move the vehicle system. For example, two or more vehicle systems may be mechanically coupled to travel together along the route. A vehicle system may also be referred to as a vehicle system consist in some embodiments.

A vehicle system may have one or more propulsion-generating vehicles (e.g., vehicles capable of generating propulsive forces or tractive efforts) connected together so as to provide motoring and/or braking capability for the vehicle system. The propulsion-generating vehicles (or propulsion vehicles) may be directly connected together in series with no other vehicle systems or cars between the propulsion-generating vehicles. Alternatively, one or more non-propulsion-generating vehicles (e.g., vehicle systems that are not capable of generating propulsive forces or tractive efforts) may be linked between two propulsion-generating vehicles. Non-propulsion-generating vehicles may include, for example, rail cars, passenger cars, or other vehicle systems that cannot generate propulsive force to propel the vehicle system.

Multiple interconnected propulsion-generating vehicles may form a vehicle system consist in which the propulsion-generating vehicles coordinate tractive and/or braking efforts with one another to move the vehicle system consist. One example is a locomotive consist that includes locomotives as the propulsion-generating vehicles. A larger vehicle system, such as a train, can have multiple sub-consists. Specifically, there can be a lead consist (of propulsion-generating vehicles), and one or more remote consists (of propulsion-generating vehicles), such as midway in a line of cars and another remote consist at the end of the train.

Although the illustrated examples include locomotives and locomotive consists, other vehicle systems may form the vehicle system. For example, a cargo carrier may include one or more propulsion-generating vehicles and one or more cargo cars for carrying cargo. Other types of vehicle systems may include automobiles, trucks, marine vessels, off-highway vehicle systems, and agricultural vehicle systems. In some embodiments, vehicle systems may not be mechanically coupled in other embodiments, but may be logically coupled by the vehicle systems communicating with each other to coordinate their movements to travel as a vehicle system, consist or swarm (collectively "consist").

The vehicle system may have a lead propulsion-generating vehicle and a remote propulsion-generating vehicle. The terms "lead," "trail," and "remote" are used to indicate which of the propulsion-generating vehicles control operations of other propulsion-generating vehicles, and which propulsion-generating vehicles are controlled by other propulsion-generating vehicles, regardless of locations within the vehicle system. For example, a lead propulsion-generating vehicle can control the operations of the trail or remote propulsion-generating vehicles, even though the lead propulsion-generating vehicle may or may not be disposed at a front or leading end of the vehicle system along a direction of travel. In DP operation, throttle and braking commands are relayed from the lead propulsion-generating vehicle system to the remote propulsion-generating vehicle systems by wireless and/or wired connections.

A vehicle system can be configured for DP operation in which throttle and braking commands are relayed from the lead propulsion-generating vehicle to the remote propulsion-generating vehicles by wireless and/or hardwired links. DP operation may include synchronous or asynchronous control (e.g., of the traction motors, dynamic braking, and air brakes) of multiple remote locomotives within a single consist or vehicle system. In addition to commands transmitted from lead to remote vehicles, messages including status information may be transmitted from the remote vehicles to the lead vehicle.

At least one technical effect of one or more embodiments described herein includes the automatic activation of a parked function of the vehicle system if one or more conditions are satisfied. For example, if the operator forgets to enable the parked function or should have enabled the parked function but chose not to, the parked function may be automatically enabled even though the operator is no longer present in the vehicle system. At least one other technical effect includes the automatic deactivation of the parked function if one or more conditions are satisfied. At least one other technical effect may include the parked function being automatically enabled for a vehicle system that was recently assigned lead status in the vehicle system. At least one other technical effect may include the parked function being automatically disabled for a vehicle system in response to the vehicle system being assigned a remote status from a lead status.

FIG. 1 schematically illustrates a vehicle system 100 having a communications system 110 for controlling one or more propulsion-generating vehicles 112A, 112B, 113, and 114. The propulsion-generating vehicles may be configured to have different relationships with respect to one another depending upon the makeup of the vehicle system. In one example, the propulsion-generating vehicle 113 may be a lead vehicle that issues commands to the other propulsion-generating vehicles (called remote vehicles). In a different example, the propulsion-generating vehicle 114 may be a lead vehicle that issues commands to the other propulsion-generating vehicles (called remote vehicles). In some embodiments, the vehicle system 100 is configured for DP operations. As described herein, the lead vehicle may also be responsible for enabling a parked function and issuing commands for braking if the vehicle system is moved while the parked function is enabled.

The remote vehicles may receive messages and/or commands from either the lead vehicle or a control tower 116. In one embodiment, a communications channel of the communications system 110 comprises a single half-duplex communications channel having a three kHz bandwidth, where the messages and commands comprise a serial binary data stream encoded using frequency shift keying modulation. The various bit positions convey information regarding the type of transmission (e.g., message, command, alarm), the substantive message, command or alarm, the address of the receiving vehicle, the address of the sending vehicle, conventional start and stop bits and error detection/correction bits. In some embodiments, the control tower communicates with the lead vehicle, which in turn is linked to and communicates the remote vehicles 112A-112C.

The vehicle system of FIG. 1 also has a plurality of non-propulsion generating vehicles 120 (e.g., railcars). In FIG. 1, the non-propulsion generating vehicles are interposed between the remote vehicles. The arrangement of vehicle systems in FIG. 1 is only shown for illustrative purposes and is not intended to be limiting. Other embodiments may include a different arrangement of the vehicle systems. The non-propulsion generating vehicles are provided with a braking system (not shown), which can be similar or identical to the braking system 300 shown in FIG. 3. In some embodiments, the braking system may apply the air brakes in response to a pressure drop in a brake pipe 122 and release the air brakes upon a pressure rise in the brake pipe. The brake pipe may run the length of the vehicle system for conveying the air pressure changes specified by individual air brake controls 124 in the lead vehicle(s) and the remote vehicles.

Optionally, an off-board repeater 126 may be disposed within radio communication distance of the vehicle system for relaying communications signals between the lead vehicle(s) and one or more of the remote vehicles. The off-board repeater may be installed in a location where direct communication between the lead vehicle and the remote vehicles is hampered, such as while the vehicle system is passing through a tunnel. The lead vehicle, the remote vehicles, the off-board repeater, and the control tower may be provided with respective transceivers 128 that are operably coupled with an antenna 129 for receiving and transmitting communications signals over the communications channel.

The transceiver of the lead vehicle is associated with a lead controller 130, such as a locomotive control module (LCM). The lead controller is configured to generate and transmit messages (e.g., commands, queries, etc.) from the lead vehicle to the remote vehicles. Messages may be generated by the lead controller in response to operator inputs. For example, the lead controller may generate and transmit messages in response to the operator manually changing the throttle and/or braking efforts or manually entering information regarding the route or the vehicle systems of the vehicle system. The lead controller may also automatically generate and transmit messages in response to receiving messages from the control tower and/or the off-board repeater. The remote vehicles may include a remote controller 132 for receiving messages from the lead controller, processing data of the remote vehicle, and responding to the messages from the lead vehicle. In some embodiments, the remote controllers are capable of being lead controllers if the corresponding vehicle is designated as the lead vehicle.

The communications system may transmit and receive different types of messages. For example, the messages may include: (1) link messages from the lead vehicle to one or more of the remote vehicles that establish the communications system between the lead vehicle and the remote vehicles, (2) commands from the lead vehicle that control one or more functions (e.g., application of motive power or braking) of one or more remote vehicles, (3) reply messages that confirm the link messages and/or commands have been received and/or reply messages that confirm the commands have been executed, and (4) status and alarm messages transmitted by the one or more remote vehicles that update or provide the lead vehicle with relevant operating information concerning the one or more remote vehicles.

In some embodiments, messages transmitted (e.g., broadcast) from the lead vehicle include identifying information of the lead vehicle, such as an address (e.g., network address). Messages from the remote vehicles may also include identifying information, such as an address (e.g., network address), of the remote vehicle transmitting the message. Based on the identifying information of the vehicle sending the message, the receiving vehicle (e.g., the lead vehicle receiving a message from a remote vehicle, or the remote vehicle receiving a message from the lead vehicle) may determine whether the receiving vehicle was an intended recipient of the message and can respond accordingly.

Messages (e.g., commands) are typically transmitted by the lead vehicle to the remote vehicles for execution. In some situations, however, a remote vehicle may issue messages to other remote vehicles and the lead vehicle. For example, a remote vehicle may be configured to detect a condition that warrants an emergency brake application. In such instances, the remote may transmit a message to other vehicles of the vehicle system to execute an emergency brake operation. As another example, a first remote vehicle may receive a message from another remote vehicle and then re-transmit that message or a modified form of that message to the lead vehicle.

A distributed power configuration of the vehicle system may operate a synchronous mode or in an asynchronous mode. In the synchronous mode, the remote vehicles follow the throttle position of the lead vehicle. If the operator moves the throttle handle from a notch five position to a notch seven position, the communications system commands each of the enabled remote vehicles to operate at a notch seven throttle. Likewise, if the operator moves the throttle handle to a dynamic brake position (i.e., where the traction motors are operated to provide a braking force to the vehicle system), the communications system commands each remote vehicle to the same dynamic brake application. In the asynchronous mode, the traction motors and/or the braking systems of the different vehicle systems may operate independently. For example, the operator may segregate the vehicle system into a front vehicle system consist and a rear vehicle system consist that each have a plurality of propulsion-generating vehicles.

Figure 2:
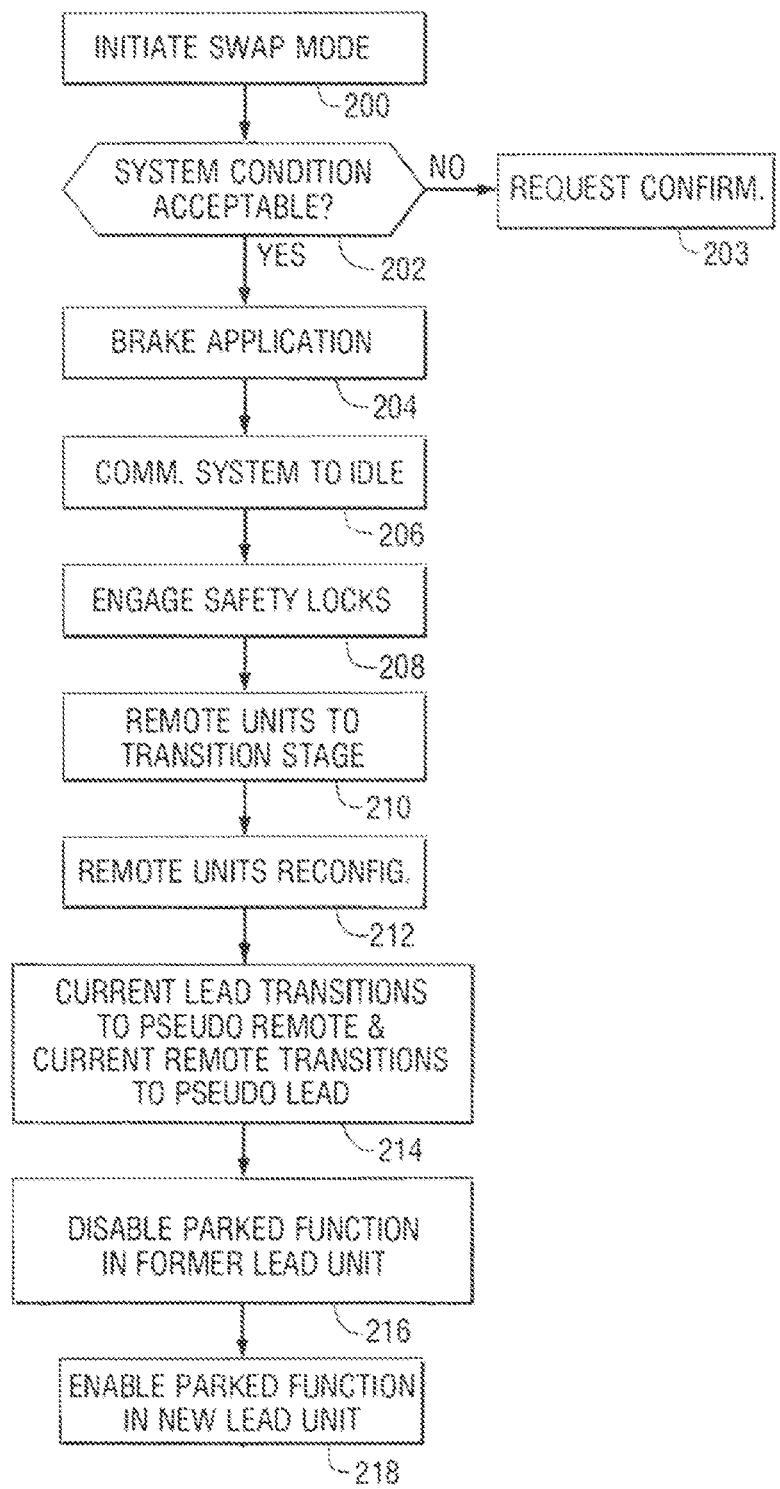
FIG. 2 is a flow chart illustrating a method in accordance with an embodiment.

FIG. 2 shows a flow chart illustrating a method for switching or swapping lead vehicles of the vehicle system. In some embodiments, the method of FIG. 2 and/or the method of FIG. 5 may be implemented by one or more processors that are configured to execute one or more sets of instructions stored in memory (e.g., one or more computer-readable mediums). The computer-readable medium (e.g., a tangible and non-transitory computer readable storage medium) may have one or more programs (or sets of instructions) that direct the controller to perform one or more operations, such as those described herein. For example, the methods may be implemented by one or more processors within, for example, at least one of the lead controller or the remote controller. In such an embodiment, the steps or operations described herein may be performed by a program stored in memory and operable in a processor (e.g., microprocessor or other logic-based device). When implemented in a processor, program code may configure the processor to create logical and arithmetic operations to process the steps and/or operations.

Optionally, the method of FIG. 2 may begin when the operator manually selects or a system automatically selects, at 200, a swap mode or operation. The swap operation is configured to change one of the propulsion-generating vehicles from being a lead vehicle to a remote vehicle and change one of the other propulsion-generating vehicles from being a remote vehicle to being a lead vehicle. It is determined, at 202, whether the vehicle system is acceptable for implementing the swap operation. The determining, at 202, may be performed by the lead controller. The lead controller may request that the operator advise, at 203, whether the lead controller has made a correct determination. For example, the operator may manually confirm that the vehicle system is acceptable for implementing the swap operation by providing a designated user input. In some embodiments, the vehicle system is acceptable for implementing the swap operation if (a) the lead vehicle is in an idle position (e.g., the throttle is in an idle position), (b) a braking system of the lead vehicle (e.g., parking brake) is set, (c) the lead vehicle is motionless or stationary, and (d) an operator-controlled device has a select device setting. For example, the operator-controlled device may be a reverser and the select device setting may be the reverser having a neutral position. In some embodiments, the vehicle system is acceptable for implementing the swap operation if the lead vehicle is currently in a parked function and a remote vehicle exists that is capable of operating as a lead vehicle and is capable of being in a parked function. The parked function is described in greater detail below with respect to FIGS. 3-5.

If the vehicle system has an acceptable configuration and state for changing lead vehicle, a full service brake application, at 204, is applied. For example, the brake application may be applied automatically by the swap operation or executed manually by the vehicle system operator. In other embodiments, the brake application is applied, at 204, by reducing the brake pipe pressure to a pressure that is greater than a full service brake application. Optionally, the command to apply the bake application is transmitted to the remote vehicles via the communications system. In some embodiments, the lead vehicle holds the brake application during a transition time period required to perform the swap operation, unless some condition warrants otherwise. In some embodiments, the remote vehicle(s) holds the brake application during the transition time period required to perform the swap operation.

At 206, the communications system receives commands (e.g., from the lead controller, remote controller, or other controller) to execute or run idle mode and await further instructions. At 208, safety interlocks of the vehicle system are instructed (e.g., by the lead controller, remote controller, or other controller) to engage. In some embodiments, the safety interlocks prohibit application of traction effort and prohibit a brake release, thereby preventing movement of the vehicle system until the transition period is over. In some embodiments, the safety interlocks that are engaged may be selected based on at least one of a current configuration of the vehicle system, a condition or conditions experienced by the vehicle system (e.g., number and placement of vehicle systems in the vehicle system, weather, grade of incline), or common practices of the industry. In some embodiments, engaging the safety interlocks includes disabling or cutting-out the remote vehicles. In such instances, the remote vehicles can respond to the brake pipe pressure changes but cannot control the brake pipe pressure, except to command an emergency brake application.

At 210, the remote vehicles receive commands (e.g., from the lead controller, remote controller, or other controller) to initiate a transition stage. For example, the transition stage may include reconfiguring the communications system so that a new lead vehicle may be assigned for the vehicle system. According to the communications system, commanding, at 210, may include using a modified link and link reply messages. The modified link message (e.g., transmitted from the lead controller, remote controller, or other controller) notifies the remote vehicles that a new lead vehicle will be assigned and provides the remote vehicles with an address or other identification information of the new lead vehicle. The remote vehicles, responsive to the modified link message, may transmit a link reply messages back to the current lead vehicle, thereby confirming that the link message had been received and processed. The link reply message may include an address of the transmitting remote vehicle.

At 212, the remote vehicles of the vehicle system may be re-configured. For example, the remote vehicles will now have new positions relative to the new lead vehicle. Based on the new position, commands from the new lead vehicle will differ from the old lead vehicle. Re-configuring, at 212, may include changing the line orientation of the vehicle system and the orientation of the individual remote vehicles.

In some embodiments, the remote vehicles (and current lead vehicle) may be permitted to generate an emergency brake application via the brake pipe during the transition stage and in response to an emergency condition occurring. Responsive to the emergency brake application, the remote vehicles and the current lead vehicle can evacuate the brake pipe to affect the emergency brake application at the vehicle systems of the vehicle system. For example, an emergency brake application may be executed in response to a vehicle system fault sensed by one or more of the vehicle systems of the vehicle system. A vehicle system fault can lead to loss of vehicle system control. In some embodiments, the remote vehicles and the current lead vehicle may also be able to initiate a penalty brake application.

Optionally, the former lead vehicle transitions, at 214, to a pseudo-remote state. Responsive to transitioning to the pseudo-remote state, the braking system of the former lead vehicle may effectively disable, at 216, the parked function of the former lead vehicle. The braking system of the former lead vehicle may be adjusted from a lead configuration to a remote configuration for when the vehicle system is parked. For example, the braking system (e.g., independent brakes, automatic brakes, and air brake) may be adjusted in a designated manner. In certain embodiments, the automatic brake handle may be moved to an off position and the independent brakes may be moved to a release position. In the remote configuration, the automatic and the independent brakes may be applied in response to a command issued by the lead vehicle and received by the remote vehicle over the communications link. Optionally, the former lead vehicle in the pseudo-remote state may command an emergency brake application via the brake pipe and via the communications system while the transition stage is in progress. Responsive to transitioning to the pseudo-remote state, the throttle handle may be placed in an idle position and the operator-controlled device (e.g., reverser) may be moved to a different device setting. For example, a reverser may be placed in a neutral position or removed. As such, the throttle and the operator-controlled device may be physically moved (even removed) when the former lead vehicle transitions to a new remote vehicle.

Also at 214, the former remote vehicle (e.g., end-of-train remote vehicle) transitions to a pseudo-lead state. Optionally, in the pseudo-remote state, the former remote vehicle may command an emergency brake application or, in another embodiment, a penalty brake application. In the pseudo-state, the former remote vehicle (or the new lead vehicle) may generate periodic vehicle system and communications system status checks and monitor the safety interlocks. During the transition stage, the braking system on the new lead vehicle may respond to commands as though it is a remote vehicle.

At 218, the braking system of the new lead vehicle is adjusted from a remote configuration to a lead configuration and the parked function of the new lead vehicle is enabled. The new lead vehicle may broadcast a command to the former lead vehicle (now new remote vehicle) and other remote vehicles to terminate the transition stage. The communications system may be commanded to return to a normal operational mode.

Figure 3:
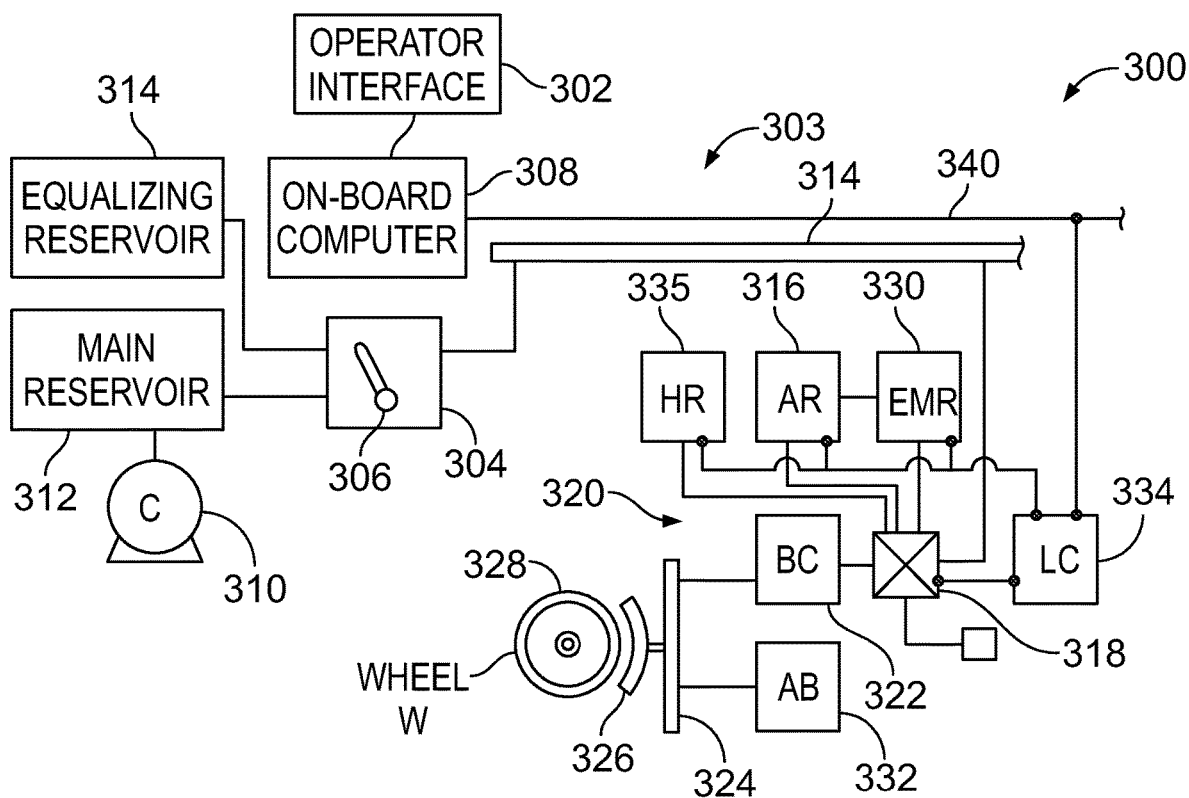
FIG. 3 is a schematic diagram of a braking system in accordance with an embodiment that may be used by the vehicle system of FIG. 1.

FIG. 3 is a schematic diagram of a braking system 300 that may be used with a vehicle system, such as the vehicle system of FIG. 1. The braking system may be used by a propulsion-generating vehicle, including a lead vehicle or a remote vehicle. The braking system may be used during performance of the method illustrated in FIG. 2 or the method illustrated in FIG. 5. As shown, the braking system may be operably connected (e.g., wirelessly or hardwired) to an operator interface 302.

FIG. 3 illustrates one example of an air brake (or pneumatic brake) system that may be used in one or more embodiments. It should be understood that other embodiments may use a modified braking system or use or also include a different type of braking system. In some embodiments, the braking system includes a an electronically-controlled pneumatic (ECP) air brake arrangement. More than one type of braking technology may be used in a single braking system. For example, a braking system may include air brakes (or pneumatic brakes), electrodynamics brakes, mechanical brakes, or electromagnetic brakes.

With respect to FIG. 3, the braking system includes an air brake sub-system 303 that is hereinafter referred to as an air brake system. The air brake (or pneumatic brake) may be controlled manually and/or automatically. For example, an operator of a vehicle system may have manual control over the air brake system through a control valve 304. The operator can adjust braking efforts to be applied in the air brake system by, for instance, moving a handle 306 that is operably coupled to the control valve. Alternatively or in addition to manual control of the air brake system, the air brake system may be automatically controlled by an on-board control system 308. The on-board control system may be in the form of a controller, a management computer, a computing device, a processor, and/or the like. The on-board control system may transmit signals over a system line (e.g., cable) extending between adjacent vehicle systems. Alternatively or in addition to the system line, the on-board control system may communicate over the rails of a track, and/or over a wireless connection or link that exists between or among the vehicle systems. The vehicle systems that include the ECP air brake arrangement may be propulsion-generating vehicles (e.g., lead or remote), or the vehicle systems may be non-propulsion-generating vehicles (e.g., railcars). In such embodiments, the air brake system may be referred to as an ECP air brake arrangement.

The air brake system may include a compressor 310 for providing compressed air to a main reservoir 312. An equalizing reservoir 314 may also be communicatively coupled to the control valve. Whether through the main reservoir or the equalizing reservoir, compressed air can be supplied through the control valve to a brake pipe that extends along the vehicle systems of the vehicle system. In some embodiments, a vehicle system (e.g., lead vehicle or remote vehicle) may include an arrangement that permits an auxiliary reservoir 316 to be charged with air via a valve arrangement 318. An air brake arrangement 320 can also be charged. The air brake arrangement 320 includes a brake cylinder 322 in communication with the valve. The brake cylinder is operable to move a brake beam 324, which is operationally connected to one or more brake shoes 326. The brake shoes may be moved toward and/or against a surface of a wheel 328.

In operation, the brake pipe is continually charged to maintain a specific pressure (e.g., 90 psi). The auxiliary reservoir and an emergency reservoir 330 may also be charged from the brake pipe. Optionally, the auxiliary reservoir and the emergency reservoir may be combined into a single volume, or main reservoir. In order to apply braking efforts to the vehicle system, the operator moves the control valve, thereby removing air from the brake pipe and reducing pressure to a lower level (80 psi). The valve ceases charging the auxiliary reservoir and transfers air from the auxiliary reservoir to the brake cylinder.

For embodiments that include piston-operable arrangements, the brake cylinder may move the brake beam and, accordingly, the brake shoe towards and against the wheel. For non-ECP air brake systems, the operator may adjust the level of braking using the control valve. The amount of pressure removed from the brake pipe causes a specific pressure in the brake cylinder, which results in a specific application force of the brake shoe against the wheel. For ECP air brake systems, the brake commands are electronically transmitted over the cable to certain vehicle systems of the vehicle system. Optionally, a vehicle system (e.g., rail car) can be equipped with a parking brake arrangement 332 for securing a vehicle system when the vehicle system is parked. The parking brake arrangement 332 may be manually controlled (e.g., hand brake) or automatically controlled (electronic spring-loaded brake). Optionally, a hatch reservoir 335 may exist to provide air to a pneumatically-operable hatch or door.

In ECP air brake systems, control signals can be transmitted from the on-board control system to one or more of the vehicle systems over the length of the vehicle system. For example, the on-board control system may communicate with other vehicle systems (e.g., other vehicles) of the vehicle system along a system line 340. For railway applications, the system line may be referred to as a trainline. Each vehicle system may be equipped with a local controller 334 (or local control module (LCM)). The local controller may be used to monitor and/or control certain operations of the air brake arrangement 320, such as operations affecting the air reservoirs and/or the valve arrangement. The operator and/or the local controller can broadcast brake commands to the vehicle systems of the vehicle system to facilitate a smooth and effective braking operation.

Non-propulsion generating vehicle systems (e.g., rail cars) may also include the parking brake arrangements 332. Parking brake arrangements can provide a mechanical locking of brakes, normally based upon user operation of the wheel to apply force to a chain connected to a brake lever system (not shown), which is connected to the brake beam. Actuation of these parking brake arrangements cause the brake shoes to contact the wheels via movement of the brake beams. The parking brake arrangement may be applied under a variety of circumstances. As described above, the parking brake arrangements may be applied when the vehicle system is left unattended (e.g., parked). The parking brake arrangements may also be used to secure the vehicle system under failure (or emergency) conditions, such as when the brake pipe pressure cannot be maintained.

Figure 4:
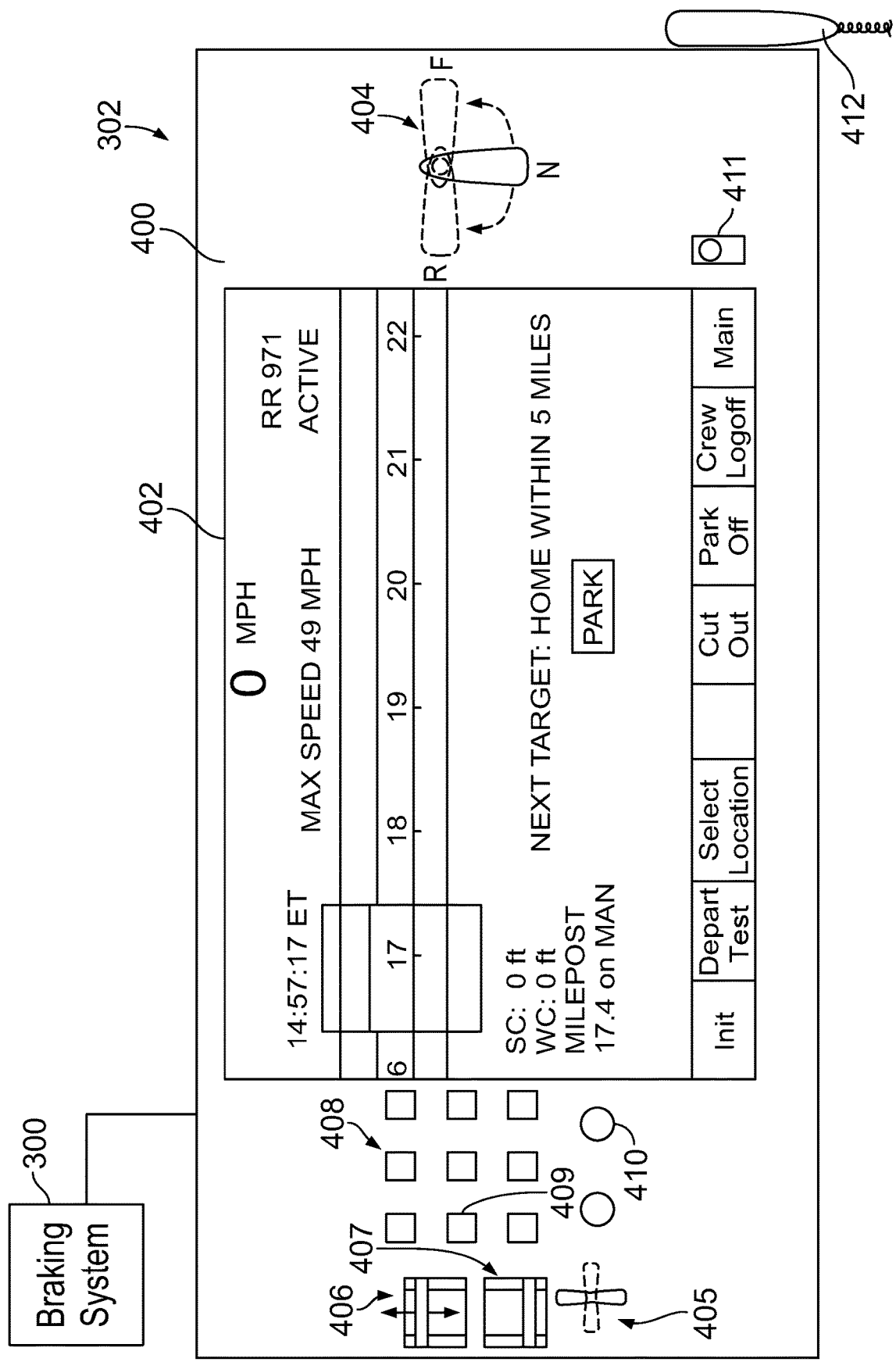
FIG. 4 illustrates an operator interface in accordance with an embodiment that may be used with the vehicle system of FIG. 1.

FIG. 4 depicts the operator interface 302 as presented to an operator of the vehicle system in accordance with an embodiment. The operator interface may be, for example, an operator console or instrument panel that presents a plurality of operator-controlled devices that enable the operator to control the vehicle system. An operator-controlled device is configured to be enabled by the operator to instruct the vehicle system to perform a desired action. As shown, the operator interface 302 may include a panel or dashboard 400 having a control screen 402 that presents information to the operator regarding operation of the vehicle system. The panel also includes a plurality of operator-controlled devices 404-410, which include a reverser handle or lever 404, a key

405, a throttle handle or slider 406, a brake handle or slider 407, an array 408 of buttons 409, knobs 410, a switch 411, and communication device 412 (e.g., voice receiver). Other operator-controlled devices may include, for example, a keyboard, mouse, or touchpad.

The control screen 402 may also include virtual operator-controlled devices 414. A virtual operator-controlled device is a graphical-user-interface (GUI) element (e.g., graphical icon) displayed on the control screen 402. Similar to the physical operator-controlled devices described above, the virtual operator-controlled devices are configured to be enabled by the operator to instruct the vehicle system to perform a desired action. Activation of the user-selectable element may be accomplished in various manners. For example, in embodiments that utilize a touch-sensitive display, the operator may press the display area to enable a virtual user-selectable element. Alternatively or in addition to, the operator may select the virtual user-selectable elements using a stylus, buttons, a mouse, keys of a keyboard, voice-activation, and the like.

Any of the various operator-controlled devices shown in FIG. 4 may be an operator-controlled device that can be used to enable a parked function of the vehicle system. As described herein, one condition for enabling the parked function may include an operator-controlled device having a select device setting from a plurality of potential device settings. Each of the operator-controlled devices in FIG. 4 is capable of having at least two different device settings selected by the operator. For example, graphical icons may be selected on the control screen, physical buttons may be pushed ON or OFF, knobs may be rotated to a predetermined degree, sliders or handles may be moved to a predetermined position, and the reverser handle may have one of a plurality of settings, including being removed entirely. Accordingly, each of the operator-controlled devices is configured to have a select device setting that is one of multiple potential device settings. Although the above description is with respect to FIG. 4, it should be understood that a variety of other operator-controlled devices may be used.

In certain embodiments, the operator-controlled device controls a physical mechanism that controls another aspect of the vehicle system. In other words, the operator-controlled device may not be used exclusively for enabling or disabling the parked function. In some embodiments, the operator-controlled device may affect movement of the vehicle system. Affecting movement may include allowing movement, causing movement, or causing a direction of movement. For example, the operator-controlled device may include the reverser handle, a brake handle, a throttle slider, a key for starting the vehicle system, and the like. In other embodiments, the operator-controlled device does not control movement of the vehicle system but controls another feature of the vehicle system. For example, the operator-controlled device may include a lock to a cabinet or door. In some embodiments, the operator-controlled device is located within the space occupied by the driver while the vehicle system is moving (e.g., cabin of a locomotive).

In particular embodiments, the operator-controlled device includes the reverser and the select device setting may be the reverser having a predetermined position or being removed entirely. The predetermined position may be, for example, a neutral position.

Figure 5:
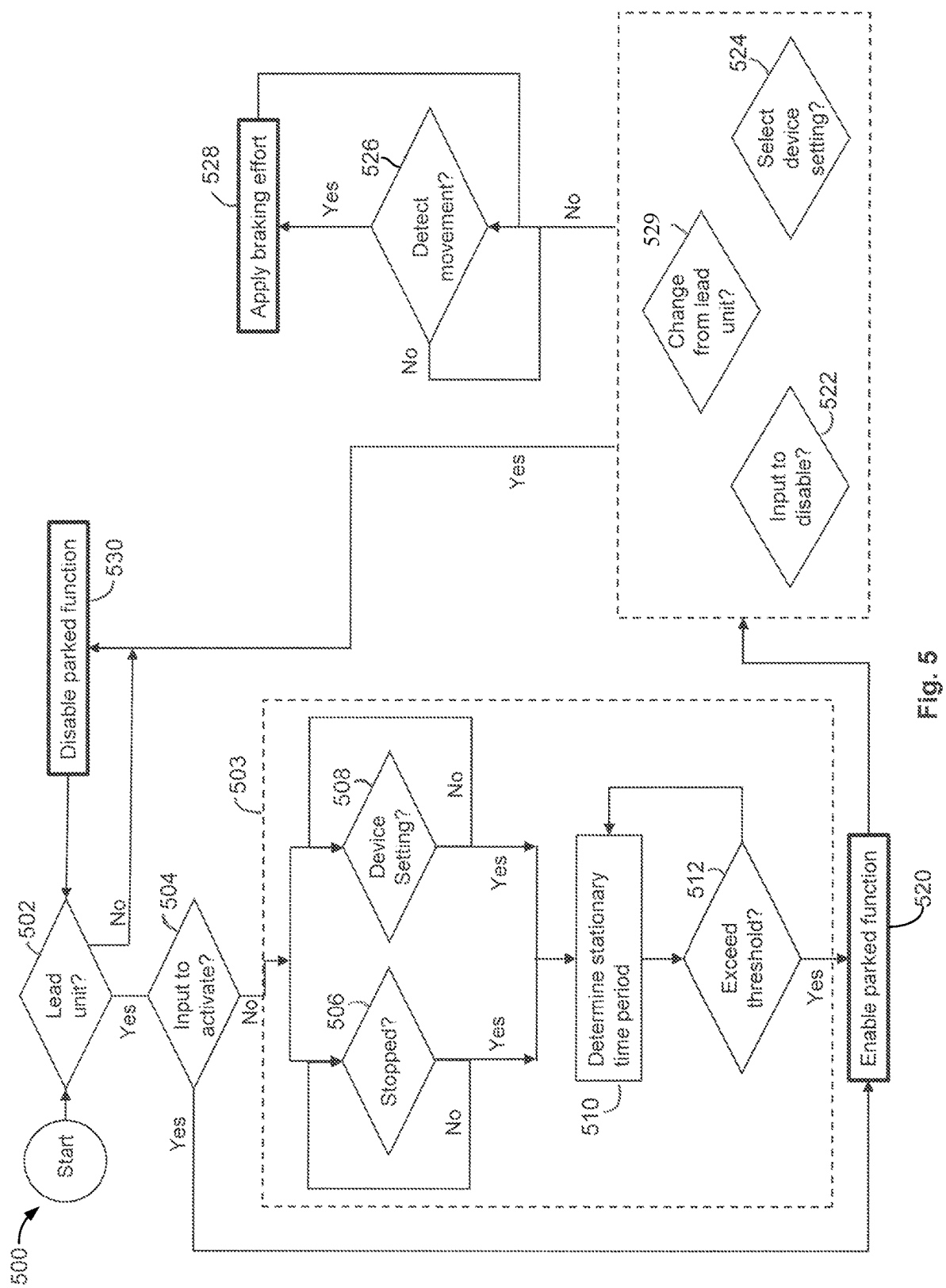
FIG. 5 is a flow chart illustrating a method in accordance with an embodiment.

FIG. 5 illustrates a flow chart of a method 500 in accordance with an embodiment. The method may include, for example, automatically enabling and/or disabling a parked function of a vehicle system. The method may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be used as one or more algorithms to direct hardware to perform one or more operations described herein.

Optionally, the automatic activation of the parked function can only be enabled if the vehicle system is determined, at 502, to be a lead vehicle of the vehicle system. As described herein, the lead vehicle may control operations of remote vehicles so that the lead vehicle and remote vehicle (s) coordinate tractive and braking efforts to move the vehicle system. Whether a vehicle system is the lead vehicle is typically established prior to embarking on a trip. For example, a local controller (or local control module) of the vehicle system may be instructed through operator inputs or by a remote controller (e.g., from a control tower) to be a lead vehicle. The local controller of the lead vehicle may communicate with other local controllers of remote vehicles (called the remote controllers). In particular embodiments, the lead vehicle may be a lead locomotive of a distributed power configuration of a locomotive consist. The lead locomotive if configured to issue commands to the remote locomotives to coordinate tractive and braking efforts of the locomotive consist.

In other embodiments, however, the vehicle system is not required to be a lead vehicle. More specifically, the parked function may be automatically enabled regardless of the relationship status of the vehicle system with respect to other vehicle systems in the vehicle system consist. If the vehicle system is the only propulsion-generating vehicle system in the vehicle system, then the vehicle system may be designated as a lead vehicle or the method may not inquire as to whether the vehicle system is the lead vehicle.

In particular embodiments, the automatic activation of the parked function is suitable for instances in which the operator forgets to enable the parked function or believes that the present circumstances do not warrant enabling the parked function. Accordingly, the method may include receiving operator inputs, at 504, to enable the parked function. Prior to receiving the operator inputs, the method may enter a detection mode at 503 as described below. If operator inputs are received, such as through the operator interface, to enable the parked function, then the detection mode ceases and the parked function is enabled at 520.

While in the detection mode 504, the vehicle system (e.g., the controller of the lead vehicle) monitors one or more conditions to determine whether to enable the parked function. For example, the detection mode may include determining, at 506, whether the vehicle system is motionless or, in other words, stopped. For example, a speed detector or gauge, such as a speedometer, may determine that an instantaneous speed of the vehicle system is zero. Alternatively or in addition to the speed detector, other sensors may detect an operating characteristic that is indicative of motionless. For example, a wheel sensor may determine that a wheel is motionless. As another example, a motionless state may be determined by a global positioning system (GPS) system. For vehicle systems having multiple vehicle systems, the operation of determining whether the vehicle system is stopped, at 504, may include confirming that each and every vehicle system having a detector (e.g., speedometer) is stopped and/or that the vehicle system as a whole is stopped based on GPS. In other embodiments, the vehicle system is considered to be stopped if the lead vehicle is stopped.

Optionally, determining whether the vehicle system is stopped, at 504, includes determining whether the lead vehicle or the vehicle system is at least partially powered-down. Although a vehicle system may be stopped, such as when waiting for a path to clear or waiting for a signal to change), the vehicle system may be fully operational. This may be referred to as being at a standstill. In other cases, the vehicle system is stopped and at least partially powered down. This may occur when the operator knows that the vehicle system will be stopped for an extended period of time (e.g., several minutes or an hour or more). When at least partially powered down, the vehicle system may consume less power than when at a standstill. As such, one or more power-consuming sub-systems or devices may be turned OFF to partially power down the vehicle system. For example, one or more engines may be powered off, power for cooling fans may be reduced, and the like.

Yet in other embodiments, the vehicle system may be mostly powered down, which may be referred to as sleep mode, or entirely shut down. When in the sleep mode or when shut down, systems and devices that are not necessary for being motionless are powered off. Optionally, one or more devices that enable faster start-up of the vehicle system may be operational in the sleep mode. Fewer devices may be operational when the vehicle system is shut down. In the sleep mode or when shut down, the braking system may be powered for initiating braking efforts while in the parked function.

For some embodiments, the vehicle system may not be considered stopped or motionless if the vehicle system is fully operational, such as when waiting at a signal. Being at least partially powered-down is often associated with a vehicle system that is intended to be motionless for an extended period of time, such as when being parked in a railyard. In some embodiments, being at least partially powered-down includes at least one traction motor, which would be fully operational under normal circumstances, being powered off. In some embodiments, being at least partially powered-down includes all traction motors being powered off.

In other embodiments, however, the parked function is automatically enabled whenever the vehicle system is stopped and one or more other conditions are satisfied. In certain embodiments, the parked function is automatically enabled whenever the vehicle system is stopped, at least partially powered down compared to being fully operational, and one or more other conditions are satisfied. In particular embodiments, the parked function is automatically enabled whenever the vehicle system is stopped, the traction motors are shut down, and one or more other conditions are satisfied.

Another condition for automatically enabling the parked function may include confirming, at 508, that the operator-controlled device has a select device setting. For example, the operator-controlled device and the select device setting may include the reverser being positioned in neutral or removed from the operator interface. As described herein, however, it should be understood that a variety of operator-controlled devices may be used to satisfy a condition for automatically enabling the parked function. In some embodiments, the operator-controlled device is not exclusively used for satisfying a condition for automatically enabling the parked function. For example, the operator-controlled device may allow movement, cause movement, or determine a direction of movement. In other embodiments, the operator-controlled device does not control movement of the vehicle system but controls another feature of the vehicle system. For example, the operator-controlled device may include a lock to a cabinet or door. Yet in other embodiments, the operator-controlled device is only used for satisfying a condition for automatically enabling the parked function. For example, an ON-OFF switch may satisfy one condition depending upon its current state.

After confirming that the vehicle system is sufficiently stopped, at 506, the duration for which the vehicle system is stopped (referred to herein as the "stationary time period") is determined at 510. The stationary time period may be predetermined (e.g., default setting) or may be selected by an operator of the vehicle system. For example, the stationary time period may be twenty (20) second, thirty (30) seconds, or more. In some embodiments, the controller begins monitoring the stationary time period begins in response to the vehicle system being stopped. If the stationary time period is exceeded, at 512, and the operator-controlled device has the select device setting when the stationary time period has been exceeded, then the parked function will be enabled. If the stationary time period is exceeded, but the operator-controlled device does not have the select device setting, then the parked function will only be enabled in response to determining that the select device setting has been achieved while the vehicle system remains stopped.

In other embodiments, the stationary time period is determined only after it is confirmed that the vehicle system is stopped and that the operator-controlled device has the select device setting. In other words, the stationary time period begins to be monitored only after determining that both conditions have been satisfied.

If each of the designated conditions has been satisfied, then the parked function is automatically enabled by the vehicle system. The above describes two primary conditions that must be satisfied for automatically enabling the parked function. These are the vehicle system being stopped for a designated time period and the operator-controlled device having a select device setting. Another possible condition includes the extent to which the vehicle system has been powered down.

In other embodiments, fewer conditions may be required or more than two conditions must be satisfied. Yet in other embodiments, the parked function may be automatically enabled if at least a majority of designated conditions are satisfied or if a combination of the designated conditions is satisfied.

After the parked function is enabled, the vehicle system may apply a braking effort, at 528, in response to detecting movement of the vehicle system, at 526. For example, if the speedometer detects a speed greater than zero or if an accelerometer senses a change in acceleration, then a braking effort may be applied. In particular embodiments, the braking effort is applied by a braking system of the vehicle system, such as an air brake system. The braking effort may be applied until the vehicle system fully stops.

As shown in FIG. 5, the method may enter another detection mode to determine whether the parked function should be disabled. The parked function may be disabled if one or more conditions are satisfied. In particular embodiments, the parked function is disabled if any one of a plurality of conditions is satisfied. These conditions may be similar to the conditions described above for enabling the parked function, or the conditions may be different. For example, in some embodiments, the vehicle system may receive, at 522, inputs (e.g., operator inputs from the driver) that instruct the vehicle system to disable the parked function. Responsive to receiving the inputs, the parked function is disabled at 530.

At 524, the vehicle system may determine that an operator-controlled device has a select device setting for disabling the parked function. The select device setting for disabling the parked function may be one or more settings other than the setting used to enable the parked function. For example, for embodiments in which the reverser enables the parked function when having the neutral position, the parked function may be disabled when the reverser is moved from the neutral position to another position (e.g., to a forward position or a rearward or reverse position). Responsive to detecting the operator-controlled device has a select device setting for disabling the parked function, the parked function may be disabled.

At 529, the vehicle system may receive inputs (e.g., operator inputs or inputs from another authority) that the status of the vehicle system is being switch from lead status to another status, such as remote status or shut-down status. The method for switching the lead status of the vehicle system may be similar or identical to the method described with respect to FIG. 2. Responsive to detecting the lead status has changed to another status, the parked function may be disabled.

In an embodiment, a system is provided that includes a controller configured to determine a stationary time period during which a vehicle has remained stationary. The controller is further configured to enable a parked function of the vehicle in response to determining that the stationary time period exceeds a designated threshold. While the parked function is enabled, the vehicle applies a braking effort to the vehicle in response to detecting movement of the vehicle.

In one or more aspects, the braking effort is applied by a braking system of the vehicle while the parked function is enabled.

In one or more aspects, the controller is further configured to detect a device setting of an operator-controlled device. The operator-controlled device controls a physical mechanism that affects movement of the vehicle. The controller is configured to enable the parked function of the vehicle in response to determining that the stationary time period exceeds the designated threshold and that the device setting is a select device setting. The select device setting is one of multiple potential device settings of the operator-controlled device. For some aspects, the vehicle is a locomotive and the operator-controlled device includes a reverser of the locomotive. For some aspects, the controller is further configured to disable the parked function responsive to at least one of detecting that the device setting has changed from the select device setting or receiving an operator input that disables the parked function.

In one or more aspects, the vehicle is part of a vehicle system that includes a lead vehicle and one or more remote vehicles whose movements are dictated by the lead vehicle. The controller is further configured to enable the parked function responsive to the vehicle being the lead vehicle. For some aspects, the controller is further configured to disable the parked function responsive to the vehicle not being the lead vehicle. For some aspects, the controller is further configured to disable the parked function in response to determining that another vehicle of the vehicle system is being assigned lead status of the vehicle system and the other vehicle has the parked function.

In an embodiment, a method is provided that includes determining a stationary time period during which a vehicle has remained stationary. The method also includes enabling a parked function of the vehicle in response to determining that the stationary time period exceeds a designated threshold and applying, while the parked function is enabled, a braking effort to the vehicle in response to detecting movement of the vehicle.

In one or more aspects, applying the braking effort to the vehicle includes applying the braking effort by a braking system of the vehicle.

In one or more aspects, the method also includes detecting a device setting of an operator-controlled device. Enabling the parked function of the vehicle may be in response to determining that the stationary time period exceeds the designated threshold and that the device setting is a select device setting. The select device setting is one of multiple potential device settings of the operator-controlled device. The operator-controlled device controls a physical mechanism that affects movement of the vehicle.

In one or more aspects, the method also includes disabling the parked function responsive to at least one of detecting that the device setting has changed from the select device setting or receiving an operator input that disables the parked function.

In one or more aspects, the vehicle is a lead vehicle of a vehicle system. The lead vehicle dictates movements of one or more remote vehicles of the vehicle system.

In one or more aspects, the method also includes disabling the parked function in response to the vehicle being changed from having a lead status to having another lower status.

In one or more aspects, the method also includes disabling the parked function in response to determining that another vehicle of the vehicle system is being assigned lead status of the vehicle system and the other vehicle has the parked function.

In an embodiment, a system is provided that includes a controller of a propulsion-generating vehicle that is part of a vehicle system including other propulsion-generating vehicles. The controller is configured to determine whether the propulsion-generating vehicle is a lead vehicle or a remote vehicle of the vehicle system whose movements are dictated by the lead vehicle. When the propulsion-generating vehicle is a lead vehicle, the controller is also configured to detect that the lead vehicle is stopped and that a main engine of the vehicle system is shut down and determine a stationary time period during which the lead vehicle has remained stationary. The controller is also configured to detect a device setting of an operator-controlled device. The operator-controlled device controls a physical mechanism that affects movement of the lead vehicle. The controller is also configured to enable a parked function of the lead vehicle in response to determining that the stationary time period exceeds a designated threshold and that the device setting is a select device setting from one of multiple potential device settings of the operator-controlled device.

In one or more aspects, while the parked function is enabled, the braking effort is applied by a braking system of the lead vehicle.

In one or more aspects, the lead vehicle is a locomotive and the operator-controlled device includes a reverser of the locomotive.

In one or more aspects, the controller is further configured to disable the parked function in response to at least one of detecting that the device setting has changed from the select device setting or receiving an operator input that disables the parked function.

In one or more aspects, the controller is further configured to disable the parked function responsive to determining that the lead vehicle is being assigned a different relationship status that is not lead status.

As described herein, embodiments may be implemented by one or more processors that are configured to execute one or more sets of instructions stored in memory (e.g., one or more computer-readable mediums). The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine. The program may be compiled to run on, for example, a 32-bit, 64-bit, or 132-bit and 64-bit operating systems.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device, and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller configured to determine whether a vehicle system formed from a first vehicle and one or more additional vehicles has remained stationary for at least a stationary time period, the controller configured to determine whether the first vehicle is a lead vehicle of the vehicle system that sends commands to the one or more additional vehicles so that the lead vehicle and the one or more additional vehicles coordinate efforts in moving the vehicle system, the controller configured to enable a parked function of the vehicle system in response to determining that the vehicle system has remained stationary for at least the stationary time period and that the first vehicle is the lead vehicle, the controller configured to direct the vehicle system to apply a braking effort in response to detecting movement of the vehicle system while the parked function is enabled, wherein the controller is configured to disable the parked function of the vehicle system responsive to the first vehicle being switched from being the lead vehicle to at least one of the one or more additional vehicles being the lead vehicle.

2. The system of claim 1, wherein the controller is configured to direct an air brake system of the vehicle system to apply the braking effort while the parked function is enabled and in response to detecting the movement of the vehicle system.

3. The system of claim 1, wherein the controller is configured to detect a position of an operator-controlled reverser device that controls a direction of the movement of the first vehicle, the controller configured to enable the parked function of the vehicle system in response to determining that the vehicle system has been stationary for at least the stationary time period, that the first vehicle is the lead vehicle, and that the position of the operator-controlled reverser device is in a designated position.

4. The system of claim 3, wherein the operator-controlled reverser device is configured to alternate between a forward position that permits the first vehicle to move in a forward direction, a neutral position that permits the first vehicle to move in the forward direction or a rearward direction, or a rearward position that permits the first vehicle to move in the rearward direction,
the controller configured to disable the parked function of the vehicle system responsive to the operator-controlled reverser device being moved to the forward position or the rearward position.

5. The system of claim 3, wherein the operator-controlled reverser device is configured to alternate between a forward position that permits the first vehicle to move in a forward direction, a neutral position that permits the first vehicle to move in the forward direction or a rearward direction, or a reverse position that permits the first vehicle to move in the rearward direction, the controller configured to enable the parked function of the vehicle system in response to determining that the vehicle system has been stationary for at least the stationary time period, that the first vehicle is the lead vehicle, and that the position of the operator-controlled reverser device is the neutral position.

6. The system of claim 1, wherein the controller is configured to disable the parked function of the vehicle system responsive to receiving an operator input.

7. A method comprising:
determining whether a vehicle system formed from a first vehicle and one or more additional vehicles has remained stationary for at least a stationary time period;
determining whether the first vehicle is a lead vehicle of the vehicle system that sends commands to the one or more additional vehicles so that the lead vehicle and the one or more additional vehicles coordinate efforts in moving the vehicle system;
enabling a parked function of the vehicle system in response to determining that the vehicle system has remained stationary for at least the stationary time period and the first vehicle is the lead vehicle;
applying a braking effort to the vehicle system in response to detecting movement of the vehicle system and while the parked function is enabled; and
disabling the parked function of the vehicle system in response to the first vehicle being switched from being the lead vehicle to at least one of the one or more additional vehicles being the lead vehicle.

8. The method of claim 7, wherein applying the braking effort to the vehicle system includes applying the braking effort by an air brake system of the vehicle system.

9. The method of claim 7, further comprising:
detecting a position of an operator-controlled reverser device that controls a direction of the movement of the first vehicle;
wherein the parked function of the vehicle system is enabled in response to determining that the vehicle system has been stationary for at least the stationary time period, that the first vehicle is the lead vehicle, and that the position of the operator-controlled reverser device is in a designated position.

10. The method of claim 9, wherein the operator-controlled reverser device alternates between a forward position that permits the first vehicle to move in a forward direction, a neutral position that permits the first vehicle to move in the forward direction or a rearward direction, or a rearward position that permits the first vehicle to move in the rearward direction, the method further comprising:
disabling the parked function of the vehicle system responsive to the operator-controlled reverser device being moved to the forward position or the rearward position.

11. The method of claim 9, wherein the operator-controlled reverser device is configured to alternate between a forward position that permits the first vehicle to move in a forward direction, a neutral position that permits the first vehicle to move in the forward direction or a rearward direction, or a reverse position that permits the first vehicle to move in the rearward direction, wherein the parked function of the vehicle system is enabled in response to determining that the vehicle system has been stationary for at least the stationary time period, that the first vehicle is the lead vehicle, and that the position of the operator-controlled reverser device is the neutral position.

12. The method of claim 7, further comprising:
disabling the parked function of the vehicle system responsive to receiving an operator input.

13. A system comprising:
a controller configured to determine whether a first vehicle of a vehicle system is designated as a lead vehicle or a remote vehicle of the vehicle system, the vehicle system including the first vehicle and at least a second vehicle, the lead vehicle configured to dictate movements of the at least the second vehicle, the controller configured to determine whether the first vehicle is stopped and that an engine of the vehicle system is shut down, the controller configured to determine whether the first vehicle is stopped for at least a stationary time period, the controller configured to determine whether a position of a reverser device is in a designated position, and
the controller is configured to enable a parked function of the first vehicle in response to determining that the first vehicle is designated as the lead vehicle, the first vehicle has been stopped for at least the stationary time period, and that the position of the reverser device is in the designated position, wherein the controller is configured to disable the parked function responsive to determining that the first vehicle is no longer designated as the lead vehicle.

14. The system of claim 13, wherein the controller is configured to direct a braking system of the first vehicle to apply a braking effort while the parked function is enabled.

15. The system of claim 13, wherein the first vehicle is a locomotive.

16. The system of claim 13, wherein the controller is configured to disable the parked function in response to at least one of detecting that the position of the reverser device has changed.

17. The system of claim 13, wherein the reverser device switches between a forward position that permits forward movement of the first vehicle, a rearward position that permits reverse movement of the first vehicle, and a neutral position that allows both the forward movement and the reverse movement of the first vehicle,
the controller configured to enable the parked function responsive to determining that the reverser device is in the neutral position, that the first vehicle is designated as the lead vehicle, and that the first vehicle has been stopped for at least the stationary time period,
the controller configured to disable the parked function responsive to determining that the reverser device is in either the forward position or the rearward position.

* * * * *